Figure 3:
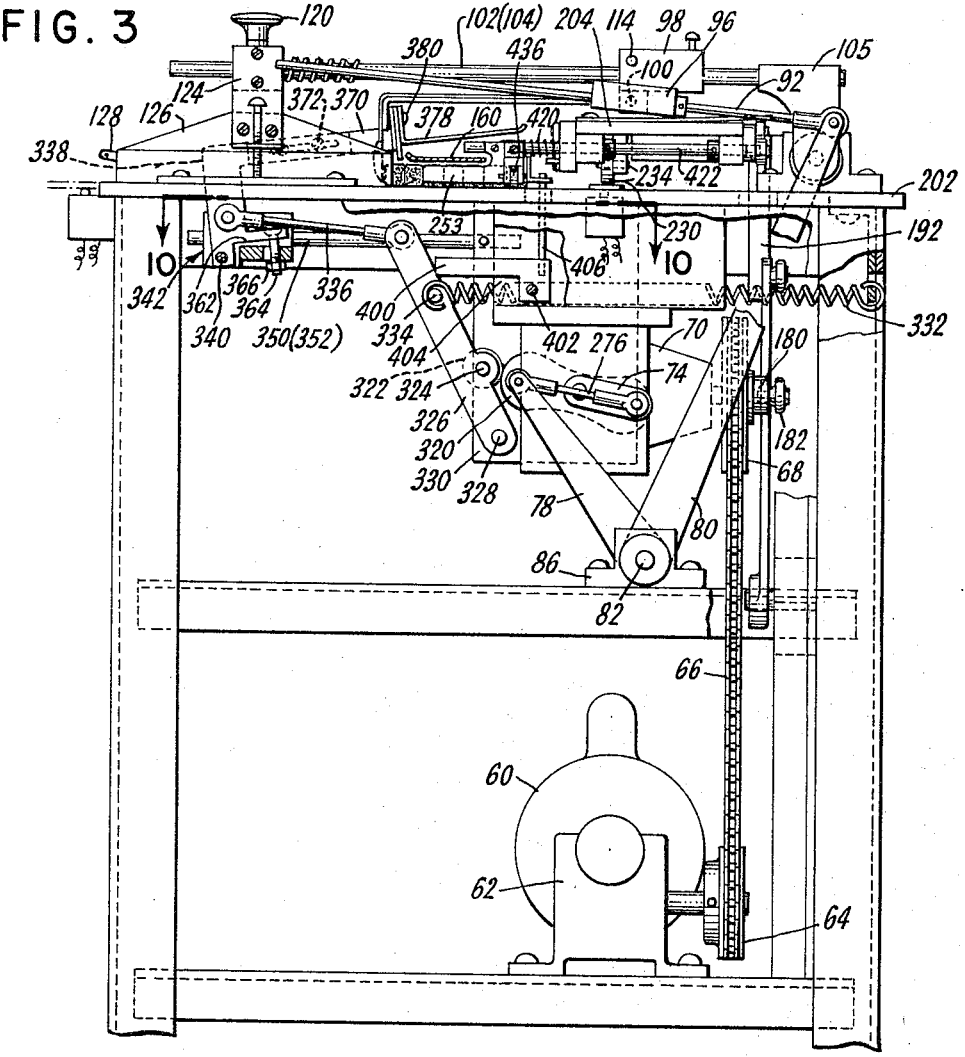

April 18, 1967  F. HOLLENTON  3,314,521
MULTI DUTY RAKE TYPE BATCH COLLATOR
Filed April 22, 1965  5 Sheets-Sheet 1
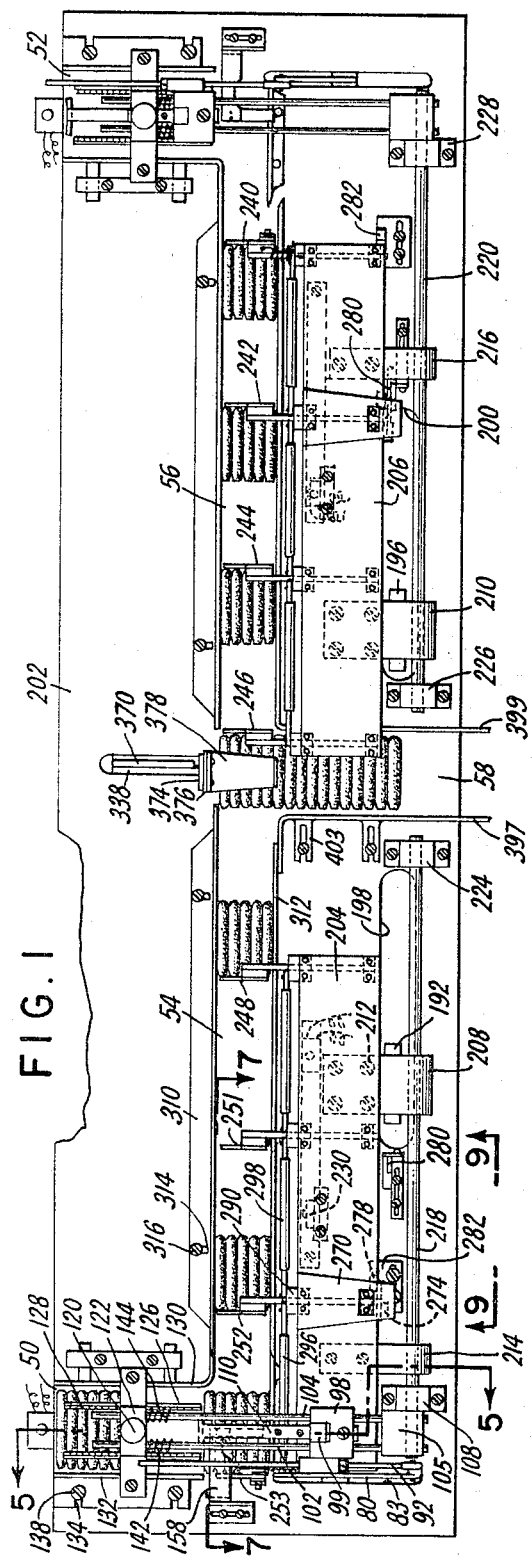
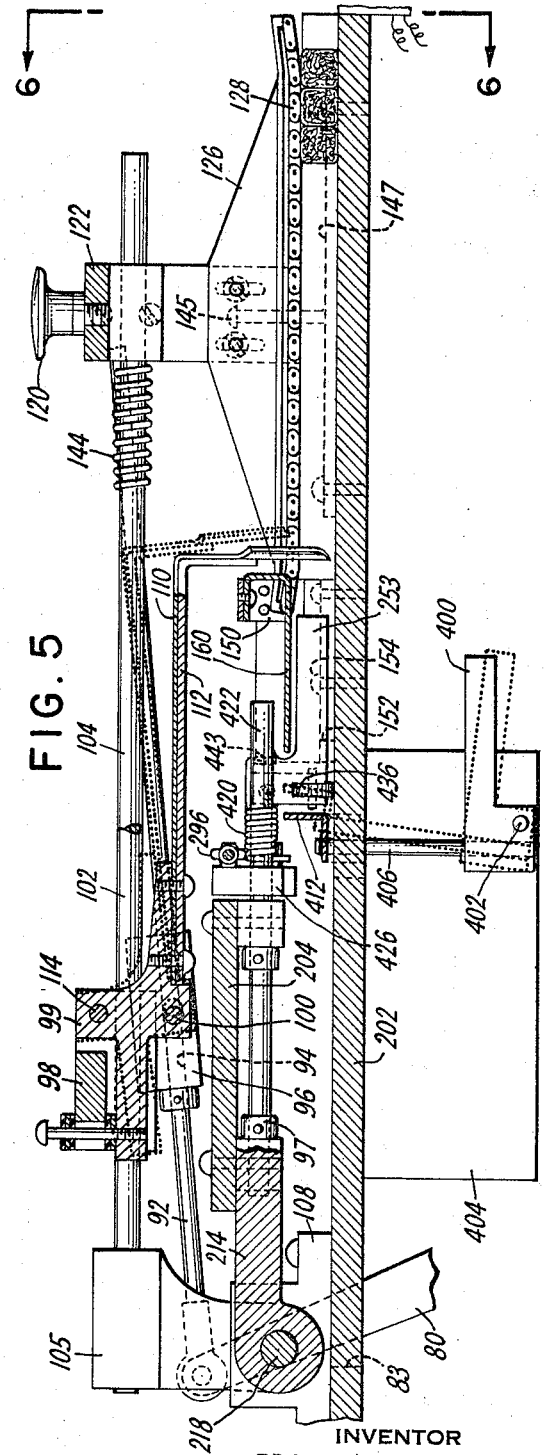
INVENTOR
FRANK HOLLENTON
BY John E. Cassidy
ATTORNEY

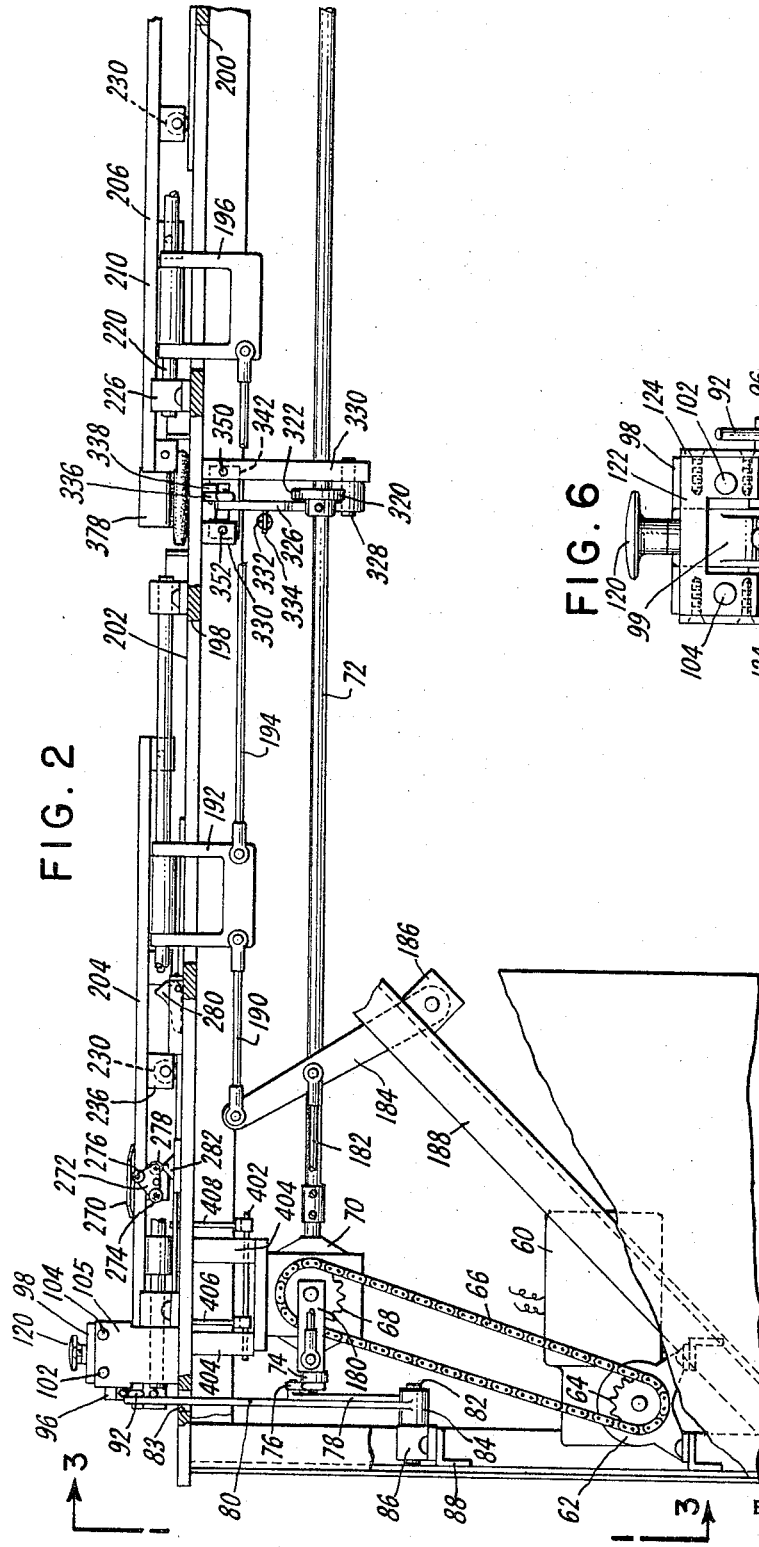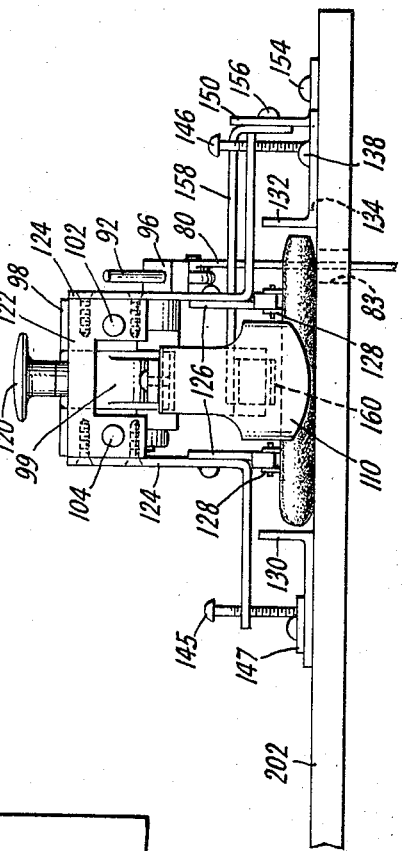

April 18, 1967 F. HOLLENTON 3,314,521
MULTI DUTY RAKE TYPE BATCH COLLATOR
Filed April 22, 1965 5 Sheets-Sheet 3

INVENTOR
FRANK HOLLENTON
BY John E. Cassidy
ATTORNEY

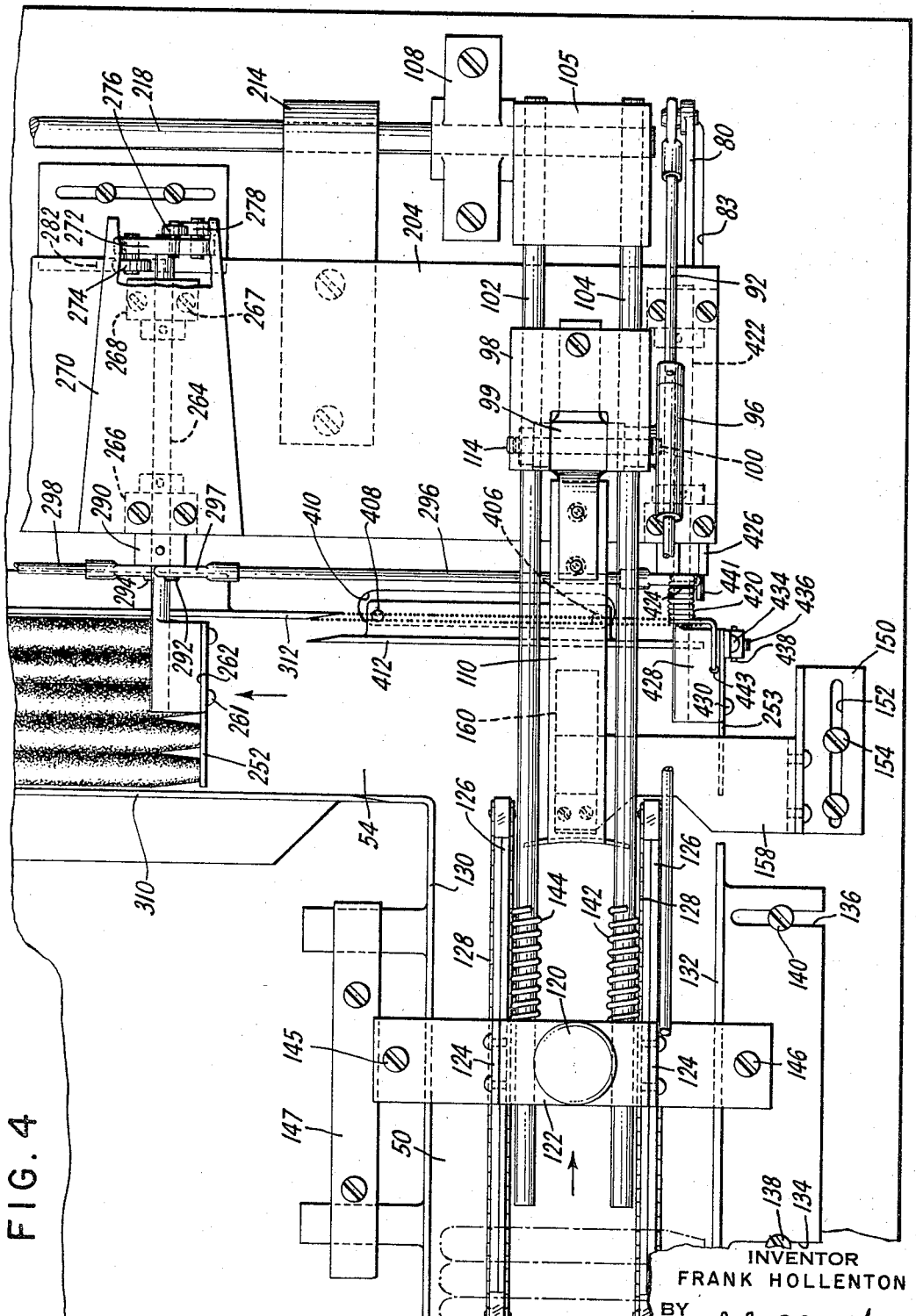

April 18, 1967 F. HOLLENTON 3,314,521
MULTI DUTY RAKE TYPE BATCH COLLATOR
Filed April 22, 1965 5 Sheets-Sheet 5
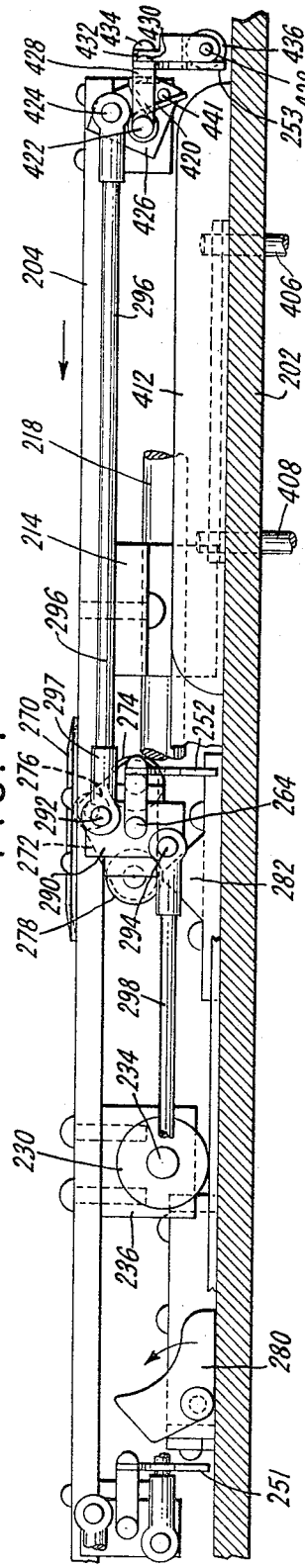
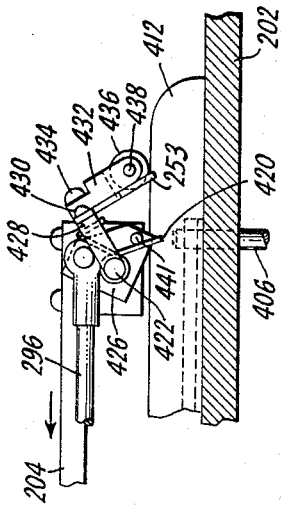
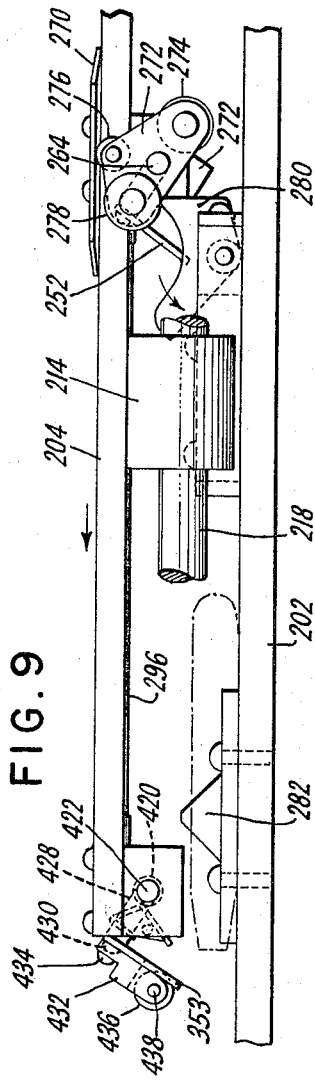
INVENTOR
FRANK HOLLENTON
BY John E. Cassidy
ATTORNEY

United States Patent Office 3,314,521
Patented Apr. 18, 1967

---

3,314,521
MULTI DUTY RAKE TYPE BATCH COLLATOR
Frank Hollenton, Mountainside, N.J., assignor to American Machine & Foundry Company, a corporation of New Jersey
Filed Apr. 22, 1965, Ser. No. 450,080
8 Claims. (Cl. 198—32)

This invention is an improved mechanism for assembling elements from a number of sources for processing. Generally, during any particular assembling, the elements will be of corresponding shape and size, such as substantially identical cigars, which have been completely or partially processed and are being directed to another machine of greater capacity for a further manufacturing operation or for packaging.

As an illustration of its proposed application, but in nowise intended as a limitation, cigars, for instance, which have been wrapped in cellophane in four machines each of which wrap 125 cigars a minute are required to be directed to a packaging machine, which can package 500 cigars a minute. The cigars are delivered from the output of each of the cellophane machines, which may be in any relation spatially one to another, to an individual one of four conveyors. Two of these four conveyors are directed to the dual inputs of an article collator which shall be called the first collator, of the present invention. The other two conveyors are directed to the dual inputs of another article collator of the invention which shall be called the second collator. Each of these collators combine the two streams incoming thereto into a single stream. The single stream output of each of collators 1 and 2 are directed into another collator, collator 3, which combines them at its output into a single stream which is delivered, to a packaging machine for instance at the rate of 500 units per minute.

An object of the invention is the improvement of collating machines.

A feature of the invention is an arrangement wherein two streams of articles are formed, one at each end of the machine which are directed laterally of the machine. Each of these two streams is then divided into individual groups of articles and each group so formed is then raked by a rake at a right angle and directed longitudinally of the machine toward its center. At the center of the machine a single outgoing stream is formed by redirecting each of groups in the longitudinally directed streams alternately again at right angles, into a single outgoing stream, moving again transversely of the machine toward the output.

Another feature of the machine is that it is substantially symmetrical with respect to its outgoing mechanism, that is to say each of the two transverse infeeds and each of the two longitudinal feeds are substantially the same.

Another feature of the invention is a single rake like mechanism in each of the two transverse infeeds which separates the articles into individual groups and draws each group into position for longitudinal movement toward the center of the machine.

Another feature of the invention is an enabling-disabling mechanism which assures that each group of articles which is formed in an incoming stream contains a predetermined number of units.

Another feature of the invention is an arrangement for adjusting the rake mechanism in the transverse infeeds so that groups formed thereby may comprise different numbers of articles at different times.

Another feature of the invention is an arrangement which permits the rake mechanism in each of the infeeds to be rotated, from a first or operating position, into a second or non-operating position, which permits ready access to the incoming transverse stream and to the enabling-disabling mechanism.

Another feature of the invention is the arrangement for reciprocating the rake in each of the transverse infeeds.

Another feature of the invention is a multiple rake in each of the longitudinal infeeds.

Another feature of the invention is an arrangement for controlling the multiple rakes so that the groups of articles in each of the two longitudinal infeeds are spaced, so that one group from each may be fed alternately into the outgoing transverse stream.

Another feature of the invention is an arrangement which reciprocates the rakes in the two longitudinal infeeds so that each of the individual rakes of the multiple rake mechanism draws each group of articles individually only a portion of the distance toward the center or outgoing rake and then is actuated rearwardly to draw the next succeeding group.

Another feature of the invention is a camming arrangement which lifts the multiple rake assembly prior to each return stroke so that each rake clears the following group of cigars which it is to engage and move forward.

Another feature of the invention is an arrangement which permits each of the two longitudinal feeds to be rotated from an operating to a non-operating position to facilitate maintenance.

These and other features of the invention will be made clear from a consideration of the following description when read with reference to the associated drawings, which taken together disclose a preferred embodiment in which the invention is presently incorporated. It is to be understood however that the invention may be incorporated in other forms which may be suggested by this disclosure.

Figure 10:
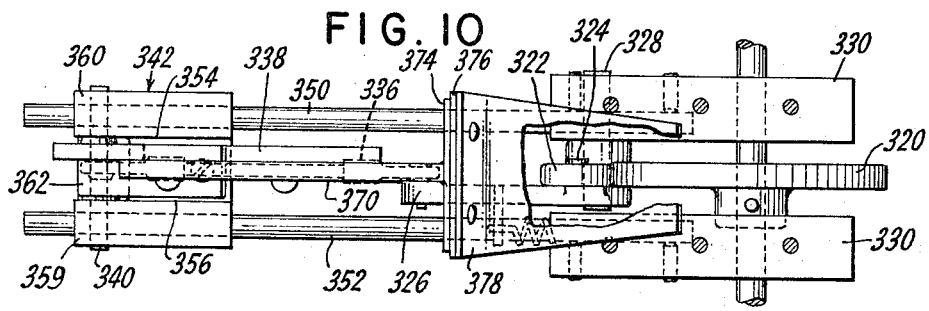

In the drawings:
FIG. 1 is a top plan view of the collating machine of the invention.
FIG. 2 is a front view taken in the direction of line 2—2 in FIG. 1 showing the driving means for the sliding rake carriages.
FIG. 3 is a left end view taken in the direction of line 3—3 in FIG. 2, showing a lateral infeed rake and its drive mechanism.
FIG. 4 is an enlarged plan view of one of the infeed rakes.
FIG. 5 is an enlarged sectional view taken on line 5—5 of FIG. 1 showing the lateral infeed rake mechanism.
FIG. 6 is an enlarged rear end view of a lateral incoming feed taken on line 6—6 in FIG. 5.
FIG. 7 is a longitudinal sectional view showing the cam control mechanism for the longitudinal infeed rakes taken on line 7—7 of FIG. 1.
FIG. 8 is another view of a portion of the right-hand end of FIG. 7 showing the mechanism in a second position.
FIG. 9 is an enlarged front view of the longitudinal multi-rake control mechanism taken on line 9—9 of FIG. 1.
FIG. 10 is a top view of a portion of the lateral infeed mechanism with the table top removed.

First the invention will be described generally as an aid in understanding the detailed description to follow.

Refer to FIGURES 1 and 2. FIGURE 1 shows a plan view and FIGURE 2 a front view of the collator. It is assumed that it is collating cigars and that the cigars are being fed into the collator on two conveyors, not shown. One conveyor delivers a stream of cigars to the collator, as shown in FIGURE 1, at the upper left. The other conveyor delivers a second stream of cigars to the collator as shown at the upper right in FIGURE 1. The collator comprises a table top having mechanism to rake in the cigars which are delivered to the table top. There is one rake mechanism at each end of the table. Each rake mechanism is reciprocated under control of a motor driven eccentric mechanism. The rakes are operated 180 degrees out of phase. The rakes are first lifted automatically and driven toward the upper end of the table as seen in FIGURE 1 through a distance which is adjustable so that upon lowering into the operative position it has separated a predetermined number of cigars, such as 5, 6, 7 or 8, depending upon the size of the cigars, from the stream, the number of which are separated and thus formed into individual groups for packaging. The rake draws the group which has separated for delivery, that is toward the lower portion of FIGURE 1, into a position where they are in registry with the longitudinal channel. The rake then is lifted and reciprocated to engage another group.

Attention is called to the fact that the transverse rake mechanism shown at the left and right each comprises a single rake only. There are two sets of multiple rakes which draw the groups of cigars, which have been brought into registry with the longitudinal channel, toward the center of the longitudinal channel. Each group of multiple rake units on the two longitudinal rakes are operated in unison and the two sets are 180 degrees out of phase. The rakes are reciprocated and each rake engages a separate group of cigars at one time. The cigars are moved from the ends of the table toward the center. Each of the rakes is moved through a short distance to draw the cigars toward the center. They are then lifted in unison and moved into position behind the next succeeding group. Each group of cigars on each side of the center of the center transverse rake is moved into registry with the central outgoing transverse channel alternately. It is engaged by a single rake which is actuated transversely of the table in the single central transverse channel, which propels the cigars in a single row thus formed to an outgoing conveyor not shown.

Now to describe the collator in detail. It is first noted that the two mechanisms which receive the two incoming streams of cigars and draw them laterally into registry with the longitudinal channel are identical. The mechanisms comprising the two multiple rakes which draw the cigars toward the single central output rake mechanism and their controls are also identical.

To facilitate reference thereto, as shown in FIGURE 1, the left-hand transverse channel, the right-hand transverse channel, the left-hand portion of the longitudinal channel, the right-hand portion of the longitudinal channel and the central transverse channel are designated 50, 52, 54, 56 and 58, respectively.

All of the movable elements are driven by a single motor 60, FIGURE 3, through a gear reduction box 62, sprocket, 64, chain 66, sprocket 68, and reduction gear box 70, which supplies power to all five rake mechanisms. The rakes in channels 50, 52 and 58 are driven by gear box 70 through main shaft 72 which runs substantially the length of the machine and is supported in suitable bearing brackets therein. The rake mechanisms for channels 54 and 56 is driven by an eccentric from gear box 70 as will be explained.

The rake mechanism for channel 50, shown in FIGURE 3, comprises eccentric arm 74, which is secured to main shaft 72, and connected at its free end, through connect-rod 76, to the free end of a bell crank, comprising arms 78 and 80, which are rotatable in a limited arc about stud 82, in bearing 84 in bracket 86 secured to bar 88 of table 202. The upper end of arm 80 projects through an elongated slot 83 in table top 202. At its upper end bar 80 is pivotably secured to the rake carriage drive rod 92. As shown to larger scale and oppositely directed in FIGURE 5, rod 92 projects through an aperture 94 in drive link block 96. A collar 97 abutting the block 96 is pinned to drive rod 92. The block 96 is frictionally secured to drive rod 92 in any convenient manner. Drive link block 96 is pivotally connected to pivot block 99 by pivot stud 100. As arm 80 is rocked in bearing 84, block 96 reciprocates main sliding block 98 on two slide rods 102 and 104, best seen in FIGURE 4, which project through apertures in the main sliding block 98. The two main slide rods 102 and 104 are secured at their right-hand ends as seen in FIGURE 4 in individual apertures in bracket 105. Bracket 105 is rotated in limited arc about shaft 218 in pillow block 108, FIGURE 5, which is secured to table 202. The reason for this will be made clear hereinafter. Secured to the lower surface of the rake pivot block 99, as shown in FIGURE 5, are the transverse input rake 110 and its stabilizer 112.

As the crank lever 80 and block 96 are moved toward the right, as seen in FIGURE 5, the initial movement will rotate pivot block 99, to which the rake 110 is secured, counterclockwise about pivot 114, secured in main slide block 98, raising the rake so that the rake will pass above the cigars as it moves toward the right. At the end of this motion, as lever 80 starts its movement to the left, it will first rotate pivot block 99 clockwise. This moves the rake 110 downwardly at a line between two adjacent cigars, after passing over a selected group of the desired number. The rake 110 will then be actuated to draw the selected group into registry with channel 54. When lever 80 is reciprocated, main sliding block 98 is reciprocated receiving its motion from the reciprocating motion of pivot 114.

The infeed rake assembly is arranged so that it may be raised to facilitate loading, inspection and maintenance. This may be understood from reference to FIGURES 5 and 6.

Near the right-hand end of FIGURE 5, there is shown a knob 120 for lifting the rake assembly and rotating it, in a limited arc, about shaft 218. Knob 120 is secured in a block 122. Main slide rails 102 and 104 project through apertures in the block 122. Fastened to the opposed sides of block 122 are opposed angle lifter elements 124. Depending from lifter elements 124 and secured thereto by screws, for instance, is a chain lifter 126. A chain 128 is secured to the bottom of the two opposed chain lifters 126 in any convenient manner. The chain is fixed in position but is arranged so that it is displaceable vertically through a short distance to accommodate variations in the thickness of the cigars. The cigars, are generally of rectangular cross section. The distance through which the chain is displaceable should not be great enough to permit the cigars to rotate. That is to say, the permissible displacement should be less than the difference between the diagonal and height of the cigar's transverse cross section. The chain engages the top surface of the cigars and maintains them in alignment.

The opposed sides of channel 50 are defined, FIGURE 6, by opposed vertical walls of right angle cigar guide elements 130 and 132 which confine the cigars with their longitudinal axes transverse the channel. The width of the channel is made adjustable to handle cigars of differing lengths. This is done, as shown in FIGURE 4, by slotting the horizontal base of one of the cigar guide elements as at 134 and 136. Screws 138 and 140 which retain the guide in position may be backed off. The guide may be then adjusted and the screws retightened.

Cushioning springs 142 and 144, FIGURE 4, are coiled about the main slides 102 and 104, to absorb the momentum of the rake mechanism as it is moved to the stopping position beyond a selected group of cigars.

Screws 145 and 146 thread through angle lifter elements 124. The bottom of the screws engage the upper surface of the horizontal portion of the angular cigar guide element and a metal bar 147 to support the rotatable rake assembly. The screws 145 and 146 permit the adjustment of the height of the chain above the bottom of channel 50, to accommodate cigars of differing thicknesses.

As best seen in FIGURE 4, the infeed channels, such as channel 50, are preferably equipped with a cigar hold down mechanism, in a position intermediate the end of chain 128 and transverse channel 54, to tend to maintain the cigars in proper position during their conveyance to the input of channel 54, after passing from beneath the chain. The hold down mechanism comprises a right-angle support element 150 having an elongated slot 152 in a horizontal portion, so that it may be adjusted in a direction parallel to channel 50 by means of screws 154. Secured to the vertical portion of element 150 by screws 156, is the vertical portion of a right angled hold down support bracket 158. Attached to the upper horizontal end of bracket 158, as seen in FIGURE 4, is the cigar hold down element per se. This is a plate 160, bent through two right-angles, and terminating at its free end in an elongated horizontal portion overlying channel 50 and separated from the bottom of the channel by the height of the cigars. Means, not shown, are provided to adjust the distance of plate 160 from the bottom of channel 50 to accommodate cigars of differing height.

The mechanism associated with channels 54 and 56 will now be described. Refer now to FIGURES 1 and 2.

The rake drive mechanism is shown particuarly in FIGURE 2. As has been explained the motor 60 actuates gears in gear reduction box 62 which drives gear 64, chain 66 and gears in gear reduction box 70. An eccentric arm 180 is driven by mechanism associated with the gear box 70. Attached to the free end of arm 180 is a connecting rod 182 which connects to a lever 184 intermediate the ends of the lever. The lower end of lever 184 is mounted for limited rotation to a bracket 186 of a frame bar 188. The free end of lever 184 is connected to a rod 190, the right-hand end of which is connected to a longitudinal rake carriage actuating element 192. It has been explained that there is an individual rake mechanism for each of channels 54 and 56. Element 192 drives one of them. The other is driven through connecting rod 194 which connects at one end to rake actuating element 192 and at the other to a corresponding element 196.

Elements 192 and 196 project upwardly through individual elongated slots 198 and 200, FIGURE 1, in table top 202. The slots are elongated sufficiently to permit elements 192 and 196 to reciprocate the two carriages 204 and 206 carrying the rakes. Elements 192 and 196 each have two arms which straddle individual slide bars 208 and 210, affixed to the bottom of carriages 204 and 206. Secured to the bottom of carriages 204 and 206, also by means of screws, are slide bars 214 and 216, respectively. Slide bars 208, 210, 214 and 216 each have apertures therein so that they may be slidingly mounted to slides 218 and 220. Bar 218 is secured at its ends in pillow blocks 108 and 224 and slide 220 is mounted correspondingly in pillow blocks 226 and 228. The upper under sides of carriages 204 and 206, as shown in FIGURE 1, are each provided with an individual roller, such as roller 230 for carriage 204, to permit this side of the carriages to roll, as best seen in FIGURE 7, on an individual track, such as track 232 on table top 202 as the opposite side of the carriage slides on its slide bar. The rollers, such as roller 230, may each be rotatably mounted on a stud, such as stud 234, FIGURE 7, secured in a block, such as block 236, fastened to the bottom of a carriage, such as carriage 204, by screws, such as screws 238.

Secured to the bottom of each carriage, as shown in FIGURE 1, are four rakes. The four rakes for channel 56 are rakes 240, 242, 244 and 246 and those for channel 54 are rakes 248, 250, 252 and 253.

The multi-rake mechanism in a longitudinal channel, such as channel 54, is arranged to operate the rakes therein in unison into a first or raking position and a second or non-raking position. When in the raking position, the rakes are disposed vertically transverse the channel to draw the cigars toward the center or output channel 58. When in the non-raking position, the rakes are rotated through an angle into a position in which they pass over the cigars on the return stroke so as to rake in the next succeeding group of cigars. How this is performed will now be described with reference to FIGURES 1, 2, 4, 7 and 9.

The rakes in each channel are linked together and operated in unison by a cam mechanism which directly actuates one of the rakes in each channel, hereinafter called the driving rake. Motion is imparted to the other three rakes in a channel from the driving rake.

As best seen in FIGURE 4, the driving rake comprises a plate element 260 which is secured by screws, such as screw 261, to a vertical face 262 formed in a rod 264. The rod 264 is rotatably mounted in blocks 266 and 268 which are secured to the carriage by screws, such as screw 267. Leaf spring 270 is fastened to the top surface of the carriage, by screws, such as 269, in a position above rod 264 and its associated actuating means, shown at the right-hand end of rod 264 in FIGURE 4. This actuating apparatus for the driving rake will now be described with reference to FIGURES 4, 7 and 9. Pinned to the right end of rod 264 as shown in FIGURE 4 is a plate 272. The plate is triangular as shown in FIGURES 7 and 9. Rotatably mounted to plate 272 by stud shafts are three rollers 274, 276, and 278. Roller 274 is mounted to the left of plate 272 as shown in FIGURE 4. This roller 274, as shown in FIGURE 9, is in lateral position to engage with a cam 280 mounted for rotation in a limited arc on stud 281 secured in a block 284 fastened to table top 202. Roller 278 shown on the front of plate 272 in FIGURE 4 and in the rear in FIGURE 9 is in lateral position to engage with a fixed cam 282 secured to the table top. Roller 276 engages with the right-hand end of leaf spring 270 which is shown broken away in FIGURE 4. The function of roller 276 and spring 270 is to lock plate 272 and the rakes controlled thereby in either one of the two positions into which it may be actuated as a result of engagement between the rollers and the cams.

FIGURE 9 as explained heretofore is a view taken in the direction of arrows 9—9 in FIGURE 1. It shows carriage 204 in its extreme right-hand position. Just prior to reaching this position, roller 274 engaged projection 360 of cam 280 and rotated, the cam clockwise until it engaged stop 364. The motion of cam 280 was arrested by engagement with the stop, whereupon projection 360 actuated rollers 274 and plate 272 clockwise into the position shown in FIGURE 9. The rotation of plate 272 into this position rotated rod 264 clockwise and raised rake 260 so that it cleared the cigars as the rake is moved toward the left in FIGURE 9 to rake a new cigar group toward the outgoing channel.

At the start of movement of the carriage in the opposite direction, roller 274 engages projection 362 of cam 280 to return the cam to position to be effective in the next cycle. Roller 276 on the rear of plate 272 as shown in FIGURE 9 engages leaf spring 270 which locks plate 272 and thereby the multi-rake assembly during each traverse of carriage 204.

When the carriage is moved to the extreme left-hand position, as shown in FIGURE 9, or the right, as shown in FIGURE 7, roller 278 engages with fixed cam 282 and actuates plate 272 and rake 264 in the opposite direction so that rake element 260 is vertical and in position to engage another group of cigars. Leaf spring 270, being secured to the carriage, moves with the carriage and maintains plate 272 and the rake assembly to whatever position it may be actuated by the cams.

Pinned to rod 264, and to each of the other corresponding rake rods, as seen in FIGURE 4, is block 290. Block 290 has two studs 292 and 294 projecting from diagonally opposed corners. Stud 292 receives connecting rod 296, which is terminated at each of its ends in an eye element, such as 297, having an aperture therein for mounting to the stud. Connecting rod 298 and each of the connecting rods in each rake assembly is similarly arranged. The connecting rod which is connected to a lower stud, such as 294 on a block such as 290, will be connected to a lower stud on the next succeeding corresponding block. The connecting rod which is connected to the upper stud such as 292 on one block will be connected to an upper stud on a corresponding block on the next succeeding rake. As rake rod 264 and its block 290 are actuated, the motion will be transmitted through connecting rods 296 and 298 and other such rods to the adjoining rakes actuating each of the rakes to one or the other of its raking or non-raking positions simultaneously.

It is to be understood that each channel 54 and 56 has an individual driving rake and an individual cam and cam control mechanism for the driving rake. Attention is also called to the fact that with respect to motion of the cigars toward the channel 58, the rakes are actuated 180 degrees out of phase. This follows because while the motion of elements 192 and 196, FIGURE 1, is always in the same direction, element 192, for instance, will be drawing the rakes in channel 54 toward channel 58 while element 196 will be actuating rakes which are in an elevated position above the cigars away from channel 58.

Channels 54 and 56 are provided with side rails, such as rails 310 and 312 for channel 54, FIGURE 1, which are fastened by screws to the table top. These preferably have right angular cross-sections with one side secured to the table top and the other disposed vertically to form a side wall for the channel. One or both of the rails in each of channels 54 and 56 may be made adjustable transversely to care for cigars of differing lengths by providing elongated apertures such as 314 which permits the rail to be adjusted in position under the screw heads 316.

Carriages 204 and 206, as has been explained, are slidable on a slide rod 218 and 220, respectively. The carriages may also be rotated about these slide rods, in limited arcs, to afford access to the rake mechanisms. Plates 208 and 214 serve as hinges for carriage 204. The upwardly projecting arms of the carriage actuator 192 straddle hinge plate 208 without being directly connected thereto to permit this. Carriage 206 is similarly arranged.

The center rake mechanism of channel 58 is arranged as follows. Pinned to main shaft 72, FIGURES 2 and 3, is a cam 320, shaped like a figure 8. Cam 320 engages a roller 322 rotatably mounted on a stud shaft 324 secured to a lever 326. Lever 326 is mounted at its lower end for limited rotation on a stud shaft 328 secured in a frame bracket 330. Lever 326 is constantly urged to the right as seen in FIGURE 3 by a coiled tension spring 332 tied at its right end to a right-hand vertical element of the frame and at its left end to a pin 334 intermediate the ends of lever 326. The free end of lever 326 is connected to the right-hand end of a connecting rod 336, the left-hand end of which is connected to a block 338 to which the center rake is secured. Block 338 is pivoted on stud 340 secured in the main center rake slide block 342. Slide block 342, as shown in FIGURE 10 has two horizontal apertures by means of which it is slidably mounted to slide bars 350 and 352. The slide block is a single unit having a central inverted L shaped cut out open at the top and defined by two side walls 354 and 356 and a single end wall projecting downwardly to the bottom of the block. The stud 340 projects through the front portion 359 of slide block 342, through the depending arm of the rake carrying block 338 in the lower portion of the L shaped cut out in slide block 342, and through the rear portion 360 of the slide block. The rake supporting block 338, as shown in FIGURE 3, has a tongue 362 projecting toward the right. A bolt 364 passes downwardly through tongue 362 and through an enlarged aperture in the bottom of slide block 340. A nut 366 is affixed to the lower portion of bolt 364. The purpose of this arrangement is to limit the anti-clockwise rotation of rake carrying block 338, as shown in FIGURE 3. Generally similar structure may be provided to limit the clockwise rotation of the block, or such rotation may be limited by engagement of tongue 362 with the upper surface of the L shaped cut out in slide block 340. Attached to the right-hand end of block 338, as seen in FIGURE 3, is the center rake assembly. This comprises an L shaped bar having one arm 370 secured to block 338 by means of screws, such as 372, which project through an elongated slot in arm 370 to permit longitudinal adjustment of the rake. The forward bent arm 374 of the L shaped bar has rake 376 and cigar hold down plate 378 secured thereto by screws such as 380. The rake 376 projects downwardly from arm 374. Hold down plate 378 is a bent element having a substantially vertical portion by means of which it is secured as described, and a substantially horizontal portion which rests on the cigars when in a lowered position. When lever 336 is in its extreme left-hand position, as seen in FIGURE 3, the center rake assembly is in its raised or extreme anti-clockwise position as rod 362 is actuating block 338 anti-clockwise about stud 340. At the start of motion toward the right lever 336 rotates block 338 clockwise about stud 340 lowering the rake mechanism into the operation position behind the group of cigars which has just been pushed into channel 58. The cigars are pushed by the rake 376 and held in proper alignment by hold down plate 378 during movement through channel 58, until exit therefrom. When the extreme right-hand position of the center rakes assembly is attained, as seen in FIGURE 3, and motion thereof to the left is initiated, the start of motion of lever 326 toward the left raises the center rake mechanism by rotating it anti-clockwise about stud 340. This permits it to clear the next succeeding group of cigars which has been pushed into channel 58. Motion of the center rake mechanism continues in the left-hand direction to the extreme left-hand position while it is maintained in the elevated position. Then the cycle repeats.

The sides of outgoing channel 58, FIGURE 1, are defined by vertical bars 397 and 399 secured to the top of table 202 in any convenient manner such as by legs 403. One or both of the bars may be made adjustable with respect to the other such as by slots in the legs and screws passing therethrough.

The collator is provided with enabling-disabling mechanism at the junction of channel 50 with channel 54 and channel 52 with channel 56. This will first be described generally with respect to channels 50 and 54 and then in detail.

The function of the enabling-disabling mechanism is to prevent the multi-rake mechanism in channel 54 if the group contains less than an assigned number of cigars. The mechanism may be arranged at times to form differing numbers of cigars in a group. At times for instance there may be five cigars in a group and at other times there may for instance be eight which may be smaller in cross-section.

The rake mechanism in channel 50 will be actuated over a stream of incoming cigars through a distance necessary to enable the rake to separate a group from the stream having the assigned number of cigars in the group. The rake draws the group across a portion of the table top into registry with channel 54. If for some reason, due for instance to the lack of cigars in channel 50, or to inordinate separation between the cigars in the stream, the cigars which are raked toward channel 54 are less than the required number, the multi-rake mechanism in channel 54 will not rake the group into channel 54. This will be achieved by disabling one rake of the multi-rakes in channel 54 so that it cannot rake the group into channel 54. The other rakes in channel 54 will continue to function to draw groups previously drawn into channel 54 toward the center output channel.

When there are sufficient cigars in a group formed by the rake in channel 50 to constitute a full group, the leading cigar in the group will be raked far enough forwardly in channel 50 to engage with and actuate a gravity controlled pivoted elongated vertical plate which is positioned transverse channel 50 at the end of the channel. The pivoted plate extends longitudinally into channel 54, closely adjacent the side thereof in substantial alignment with the end of channel 50. The pivoted plate is actuable into two positions. When actuated by a group of cigars having a full complement of cigars, into a first position, the pivoted plate is disposed in its enabling position, to permit the rake of the multi-rake which coacts with channel 50, hereinafter termed rake A, to function normally. When the pivoted plate is actuated into its second or it will be in the path of a roller on a cam mechanism attached to rake A in which position the upper edge of the pivoted plate forms a track for the mechanism of rake A. The cam elevates rake A into an inoperative position during the traverse of rake A from channel 50 into channel 54. Therefore rake A will be ineffective to rake any cigars from channel 50 into channel 54. This will now be described in detail with reference to FIGURES 2, 4, 5, 7 and 8.

Two gravity controlled counter weights, such as 400 in FIGURE 5, are rotatably mounted near each end of a stud shaft 402 secured in frame members such as 404. Two rods 406 and 408, FIGURE 2, project upwardly from the counter weights through an elongated aperture 410, FIGURE 4, in the table top 202. Attached to the upper ends of rods 406 and 408 is a track element 412 of right angled cross section. The rods are affixed to the substantially horizontal portion of element 412 while the upper edge of the substantially vertical portion thereof forms the track for rake A when the element is in the disabling position. The two counter weights, such as 400, as shown in FIGURE 5, normally are both actuated about stud 402 in a clockwise direction to a first, or lower position, by the effect of gravity. The rods 406 and 408 and track element 412 are similarly rotated. This moves the track element a short distance transversely into channel 54 to a position wherein it intercepts a roller 436 on rake A. When a full complement of cigars is in a group in registry with channel 54, the cigars rotate the assembly, against the effect of gravity on the counter weights, into its alternate position, in which the track element 412 does not engage the roller which controls rake A and raking therefore proceeds normally.

Refer now to FIGURES 1, 4, 7 and 8. First, it is explained that the rakes such as rake A in channels 54 and 56 are rotatable in a limited arc about their respective rake rods for reasons that will be made clear hereinafter.

The connecting rod 296 is connected to a stud 424 in the upper portion of vertical plate 426 which actuates rake rod 422 to the operate and non-operate positions. Mounted on rod 422 for rotation in a limited arc, is bar 428 to which rake 253 is attached by screws such as 430. A roller carrying block 432 is also secured to bar 428 by screws 434. The lower portion of block 432 is bifurcated to receive a roller 436 mounted on a stud 438, which is fixed in the opposed branches of block 432. A helical spring 420 is coiled about rake rod 422. The spring is fixed at one end against pin 441 in plate 426 and at the other end in a perforation 443 in bar 428. Normally the spring is not under tension.

Assuming a full complement of cigars, track element 412 will be out of the way. Connecting rod 296 will be actuated to its two positions as explained for other rake connecting rods. Connecting rod 296 will actuate plate 426 moving rake rod 422 to its two positions. Spring 420 will move the assembly comprising bar 428, the rake and roller into an operate and non-operate position.

When there is less than a full complement of cigars, track element 412 is interposed in the path of roller 436. Roller 436 will roll up on the track, against the tension of spring 420, on the raking traverse, carrying the rake to a position above the cigars. It is to be understood that the flexible connection through spring 420 permits the raking mechanism to be rotated to its upper position while the other rakes in a multi-rake assembly are in their lower positions.

What is claimed is:

1. A multi-rake in a conveying channel in an article collating mechanism, said multi-rake comprising a plurality of transverse rake units spaced one from another longitudinally of said channel, means at the input to said channel for separating articles into groups each having a predetermined number of articles therein, means connected to said rake units for reciprocating said rake units in unison to convey articles in said channel, disabling means at the input of said channel, means responsive to a deficiency in the number of articles in a group for disabling one of said rake units only.

2. A mechanism comprising a table top, a reciprocable carriage above said table top, a reciprocable linkage below said table top, an element fixed to said carriage for communicating motion from said linkage to said carriage, means defining an elongated aperture in said table top, a U shaped driving element in said linkage having a first arm projecting through said aperture and disposed to make contact engagement on one side of said element fixed to said carriage, so as to drive it in a first direction, said driving element having a second arm projecting through said aperture and disposed to make contact engagement on the opposite side of said element fixed to said carriage from said one side, so as to drive it in a second direction opposite from said first direction.

3. A mechanism is accordance with claim 2, having a slide bar for said carriage above said table top and a combined hinge and slide connecting said carriage to said bar, whereby said carriage may be reciprocated on said bar and rotated limitedly about it.

4. In an article conveying channel, a hold down device for holding articles down in said channel, during conveyance therein, said device comprising a chain fixed in position against substantial longitudinal motion, said chain above said channel, said chain having sufficient slack to engage articles of irregular cross-section in said channel to thereby hold them against rotation by the effect of gravity on said chain.

5. An article conveying channel in accordance with claim 4, having a rake mechanism therein, a linkage for reciprocating said rake mechanism in said channel and hinge means connected to said chain and said rake to adapt them for limited rotation to facilitate maintenance of said channel.

6. A collator mechanism comprising an article conveying channel having a reciprocable rake for raking articles to be collated, a chain hold down mechanism in said channel, said chain fixed near its ends and having slack sufficient to permit engagement with articles of differing cross-section being conveyed in said channel, to prevent their rotation, and means connecting said hold down mechanism and said rake to a hinge, so that they may be rotated to afford access for maintenance.

7. A conveyor having a reciprocable rake, a reciprocable linkage for driving said rake, a rake rod for carrying said rake, a cam mechanism for controlling the actuating of said rake rod to operate said rake into a normal operative and a normal inoperative position and flexible means interconnecting said rake rod and said rake to permit the rake to be actuated into a non-operative position when said linkage is in the normal operative position.

8. Reciprocable raking mechanism having cam mechanism comprising a plate having a first roller to actuate said rake into a first attitude, and a second roller to actuate said rake into a second attitude, said first roller engageable with a first fixed cam and said second roller engageable with a second cam, respectively, said second cam having an element thereon actuable in a limited arc about a pivot in said second cam, a stop on said second cam, to first arrest said rotation of said second cam and then to actuate said second roller to set said rake in said second attitude, a third roller on said plate and a spring on said reciprocable mechanism for locking said first and said second rollers during opposite traverses of said reciprocable mechanism.

References Cited by the Examiner
UNITED STATES PATENTS

| | | | |
|---|---|---|---|
| 1,188,368 | 6/1916 | Molins | 53—148 |
| 1,764,663 | 6/1930 | Voight | 53—148 X |
| 2,142,271 | 1/1939 | Herrmann. | |

EVON C. BLUNK, *Primary Examiner.*

MARVIN A. CHAMPION, *Examiner.*

A. C. HODGSON, *Assistant Examiner.*